United States Patent
Cortese et al.

(10) Patent No.: US 7,498,087 B2
(45) Date of Patent: *Mar. 3, 2009

(54) VAPOUR TURBINE

(75) Inventors: Carlo Cortese, Prato (IT); Paolo Bendinelli, Quattro Strade di Lavaiano-Lari (IT); Marco De Iaco, Florence (IT); Lorenzo Cosi, Florence (IT); Marco Anselmi, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 295 days.

This patent is subject to a terminal disclaimer.

(21) Appl. No.: 11/311,482

(22) Filed: Dec. 20, 2005

(65) Prior Publication Data

US 2006/0140775 A1    Jun. 29, 2006

(30) Foreign Application Priority Data

Dec. 23, 2004   (IT) .......................... MI2004A2481

(51) Int. Cl.
*F03B 3/12*   (2006.01)

(52) U.S. Cl. .................. 428/680; 428/666; 428/457; 416/241 R; 416/229 R; 420/441; 420/442; 420/448; 420/453; 60/641.1; 60/641.2; 60/721

(58) Field of Classification Search ................. 428/627, 428/666, 680, 215, 216, 334, 335, 336, 457; 416/241 R, 229 A, 223 A; 60/641.1, 641.2, 60/641.3, 641.4, 641.5, 721; 29/889.7, 889.71, 29/889.2, 889, 2, 889.72; 420/441, 442, 420/448, 453; 148/426, 427
See application file for complete search history.

(56) References Cited

U.S. PATENT DOCUMENTS

| 4,496,635 A | * | 1/1985 | Wang et al. | ................. | 428/680 |
| 2006/0140752 A1 | * | 6/2006 | Cortese et al. | ........... | 415/170.1 |
| 2006/0140774 A1 | * | 6/2006 | Cortese et al. | .......... | 416/241 R |

FOREIGN PATENT DOCUMENTS

JP    07-278780    * 10/1995

* cited by examiner

*Primary Examiner*—John J. Zimmerman
*Assistant Examiner*—Aaron Austin
(74) *Attorney, Agent, or Firm*—Nixon & Vanderhye, P.C.

(57) ABSTRACT

Vapor turbine operating with geothermal vapors containing corrosive agents such as chlorides and/or sulfides in particular. The turbine comprises a series of rotor blades made of a nickel alloy containing a quantity of nickel ranging from 55% to 59% by weight to avoid the washing of the geothermal vapors, maintaining a high useful life of the series of rotor blades and vapor turbine.

4 Claims, No Drawings

VAPOUR TURBINE

BACKGROUND

This application is a new U.S. utility application claiming priority to IT MI2004A002481 filed 23 Dec. 2004, the entire content of which is hereby incorporated by reference.

The present invention relates to a vapour turbine which can be used for obtaining energy from geothermal vapours.

Vapour turbines which operate with geothermal vapours come into contact with aggressive and/or corrosive substances for the components of the turbine itself.

Even small quantities of aggressive substances such as chlorides and sulfides, cause the corrosion of the vapour turbine components, such as rotor blades, stator blades and sealing laminas.

The materials currently used for vapour turbine components are martensitic stainless steels which are strongly subject to corrosion phenomena on the part of aggressive and/or corrosive agents.

The corrosion is particularly high in the transition area between overheated vapour and damp vapour (Dew Point).

In this area, the solid particles contained in the geothermal vapour form large deposits on the surface of the blades.

During the functioning of the turbine, the deposits accelerate the corrosion process under way, due to the increase in localized concentration of corrosive agents such as chlorides and sulfides.

Corrosion of the turbine components jeopardizes the correct functionality of the turbine itself as well as the preventive maintenance plan programmed for it.

In order to reduce maintenance interventions and consequently also substitution of the components themselves, the geothermal vapours containing aggressive substances in a higher quantity than a predetermined percentage, are "washed" with water.

This reduces the concentration of aggressive substances present in the geothermal vapours.

A first disadvantage is that the washing operations of geothermal vapours causes an increase in the running and maintenance costs of the plant, also increasing its complexity.

Another disadvantage is that washing the vapour reduces the enthalpy available at the turbine inlet and consequently the useful work of the turbine itself is reduced.

BRIEF DESCRIPTION OF THE INVENTION

An objective of the present invention is to provide a vapour turbine operating with overheated geothermal vapours normally containing corrosive agents which avoids the washing of said geothermal vapours.

A further objective is to provide a vapour turbine operating with geothermal vapours, normally containing corrosive agents which has a high conversion efficiency of the energy available at the inlet.

Another objective to provide a vapour turbine which operates with overheated geothermal vapours and which has a high useful life.

Yet another objective to provide a vapour turbine operating with geothermal vapours, containing corrosive agents, having reduced maintenance costs.

These objectives according to the present invention are achieved by providing a vapour turbine operating with geothermal vapours containing corrosive agents including chlorides and/or sulfides wherein said turbine comprises a series of rotor blades made of a nickel-chromium-molybdenum-niobium (NCMN) alloy containing a quantity of nickel ranging from 55% to 59% by weight of said NCMN alloy; a quantity of chromium ranging from 19% to 22.5% by weight of said NCMN alloy; a quantity of molybdenum ranging from 7.0% to 9.5% by weight of said NCMN alloy; and a quantity of niobium ranging from 2.75% to 4% by weight of said NCMN alloy.

DETAILED DESCRIPTION OF THE INVENTION

The characteristics and advantages of a vapour turbine operating with geothermal vapours will appear more evident from the following illustrative and non-limiting description of the present invention.

According to the present invention, a vapour turbine is provided, operating with geothermal vapours containing aggressive or corrosive agents such as chlorides and/or sulfides in particular.

The vapour turbine comprises a series of rotor blades made of a nickel alloy containing a quantity of nickel ranging from 55% to 59% by weight to avoid the washing of said geothermal vapours, at the same time maintaining a high useful life of said series of rotor blades and said vapour turbine.

It is advantageously possible to convert, by means of said turbine, a greater quantity of energy as the non-washed geothermal vapours have a higher enthalpy with respect to washed geothermal vapours.

Said turbine is advantageously particularly efficient for geothermal vapours containing a quantity of chlorides higher than 2 ppm avoiding the washing thereof.

Said nickel alloy is preferably a nickel-chromium-molybdenum-niobium alloy.

Said nickel alloy preferably comprises a quantity of chromium ranging from 19% to 22.5% by weight, a quantity of molybdenum ranging from 7.0% to 9.5% by weight, a quantity of niobium ranging from 2.75% to 4% by weight.

Said nickel alloy is preferably a super-alloy of nickel known commercially as INCONEL 725.

Said turbine preferably also comprises a series of stator blades made of a nickel-chromium-molybdenum alloy to avoid the washing of said geothermal vapours, at the same time maintaining a high useful life of said series of stator blades and the vapour turbine itself.

Said nickel-chromium-molybdenum alloy preferably comprises a quantity of nickel ranging from 54% to 58% by weight, a quantity of chromium ranging from 21% to 23% by weight, a quantity of molybdenum ranging from 12% to 14.5% by weight.

Said nickel-chromium-molybdenum alloy is preferably a super-alloy of nickel known commercially as HASTELLOY C22.

Said turbine preferably also comprises a series of sealing laminas made of said nickel-chromium-molybdenum alloy and in particular made of HASTELLOY C22.

The purpose of this is to avoid the washing of said geothermal vapours, maintaining a high useful life of said series of rotor blades, stator blades and sealing laminas of said vapour turbine.

According to a further aspect of the present invention, the use of a series of rotor blades made of a nickel-chromium-molybdenum-niobium alloy, in particular made of INCONEL 725, for a vapour turbine operating with geothermal vapours containing corrosive agents, such as chlorides and/or sulfides in particular, is evident, to avoid the washing of said geothermal vapours, maintaining a high useful life of said series of rotor blades.

Advantageously a vapour turbine of the present invention is capable of operating with overheated geothermal vapour and is also capable of avoiding washing operations of the geothermal vapour when this contains corrosive substances such as chlorides and/or sulfides in a quantity higher than 2 ppm.

It can thus be seen that a vapour turbine according to the present invention achieves the objectives specified above.

The vapour turbine of the present invention thus conceived can undergo numerous modifications and variants, all included in the same inventive concept.

Furthermore, in practice, their dimensions and components can vary according to technical demands.

What is claimed is:

1. A vapour turbine operating with geothermal vapours containing corrosive agents including chlorides and/or sulfides wherein said turbine comprises a series of rotor blades made of a nickel-chromium-molybdenum-niobium (NCMN) alloy containing a quantity of nickel ranging from 55% to 59% by weight of said NCMN alloy; a quantity of chromium ranging from 19% to 22.5% by weight of said NCMN alloy; a quantity of molybdenum ranging from 7.0% to 9.5% by weight of said NCMN alloy; and a quantity of niobium ranging from 2.75% to 4% by weight of said NCMN alloy.

2. The turbine according to claim 1, wherein said turbine further comprises a series of stator blades made of a nickel-chromium-molybdenum NCM alloy.

3. The turbine according to claim 2, wherein said nickel-chromium-molybdenum alloy comprises a quantity of nickel ranging from 54% to 58% by weight of said NCM alloy, a quantity of chromium ranging from 21% to 23% by weight of said NCM alloy, and a quantity of molybdenum ranging from 12% to 14.5% by weight of said NCM alloy.

4. The turbine according to claim 2, wherein said turbine further comprises a series of sealing laminas made of said nickel-chromium-molybdenum alloy.

* * * * *